(12) United States Patent
Makino et al.

(10) Patent No.: US 10,934,910 B2
(45) Date of Patent: Mar. 2, 2021

(54) EXHAUST GAS CLEANING CATALYST

(71) Applicant: CATALER CORPORATION, Kakegawa (JP)

(72) Inventors: Haruka Makino, Kakegawa (JP); Yasutaka Nomura, Kakegawa (JP); Satoru Inoda, Kakegawa (JP); Sho Hoshino, Kakegawa (JP); Ryota Onoe, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/490,985

(22) PCT Filed: Mar. 16, 2018

(86) PCT No.: PCT/JP2018/010460
§ 371 (c)(1),
(2) Date: Sep. 4, 2019

(87) PCT Pub. No.: WO2018/180593
PCT Pub. Date: Oct. 4, 2018

(65) Prior Publication Data
US 2020/0011221 A1    Jan. 9, 2020

(30) Foreign Application Priority Data

Mar. 27, 2017   (JP) .............................. JP2017-061422

(51) Int. Cl.
*F01N 3/035* (2006.01)
*F01N 3/022* (2006.01)
(Continued)

(52) U.S. Cl.
CPC ........... *F01N 3/035* (2013.01); *F01N 3/0222* (2013.01); *F01N 3/2803* (2013.01);
(Continued)

(58) Field of Classification Search
CPC ...... F01N 3/0222; F01N 3/035; F01N 3/2882; F01N 3/2803; B01D 53/94; B01D 2258/01
(Continued)

(56) References Cited

U.S. PATENT DOCUMENTS 4,857,089 A * 8/1989 Kitagawa ........... B01D 53/9454
55/523
7,062,904 B1 * 6/2006 Hu .......................... F01N 3/035
60/286
(Continued)

FOREIGN PATENT DOCUMENTS

GB          2538414 A      11/2016
JP     2002-102622 A       4/2002
(Continued)

OTHER PUBLICATIONS

Jun. 12, 2018 International Search Report issued in International Patent Application No. PCT/JP2018/010460.
(Continued)

*Primary Examiner* — Tom P Duong
(74) *Attorney, Agent, or Firm* — Oliff PLC

(57) ABSTRACT

An exhaust gas cleaning catalyst that has: a substrate having a wall flow structure, wherein an entry side cell, in which the end part on an exhaust gas inflow side is open, and an exit side cell, in which the end part on the exhaust gas outflow side is open, are divided by a porous dividing wall; and a first catalyst layer that includes a metal catalyst and is disposed within the dividing wall so as to be in contact with the exit side cell and not in contact with the entry side cell, and no catalyst layer is provided in the region in contact with the entry side cell.

10 Claims, 3 Drawing Sheets

(51) Int. Cl.
*F01N 3/28* (2006.01)
*B01D 53/94* (2006.01)

(52) U.S. Cl.
CPC ............ *F01N 3/2882* (2013.01); *B01D 53/94* (2013.01); *B01D 2258/01* (2013.01)

(58) Field of Classification Search
USPC ...... 422/168, 177, 180; 55/523; 60/274, 297
See application file for complete search history.

(56) References Cited

U.S. PATENT DOCUMENTS

| | | | |
|---|---|---|---|
| 2007/0140928 A1 | 6/2007 | Beall et al. | |
| 2009/0087365 A1 | 4/2009 | Klingmann et al. | |
| 2011/0078997 A1* | 4/2011 | Boorse ............... | B01D 53/9445 |
| | | | 60/274 |
| 2011/0179777 A1* | 7/2011 | Chandler ............. | F01N 3/0222 |
| | | | 60/297 |
| 2012/0247092 A1* | 10/2012 | Boorse ............... | B01D 53/9468 |
| | | | 60/301 |
| 2013/0216439 A1 | 8/2013 | Johansen | |
| 2014/0086805 A1 | 3/2014 | Sugimoto et al. | |
| 2015/0152768 A1 | 6/2015 | Arulraj et al. | |
| 2015/0202572 A1 | 7/2015 | Chiffey et al. | |
| 2016/0115835 A1 | 4/2016 | Daido et al. | |
| 2018/0028972 A1 | 2/2018 | Kitamura et al. | |

FOREIGN PATENT DOCUMENTS

| | | |
|---|---|---|
| JP | 2002-346396 A | 12/2002 |
| JP | 2006-007117 A | 1/2006 |
| JP | 2007-185571 A | 7/2007 |
| JP | 2008-207082 A | 9/2008 |
| JP | 2008-302355 A | 12/2008 |
| JP | 2009-082915 A | 4/2009 |
| JP | 2009-519814 A | 5/2009 |
| JP | 2014-069183 A | 4/2014 |
| JP | 2014-508631 A | 4/2014 |
| JP | 2015-014198 A | 1/2015 |
| JP | 2016-539803 A | 12/2016 |
| WO | 2016/133086 A1 | 8/2016 |

OTHER PUBLICATIONS

Nov. 14, 2019 Extended European Search Report issued in European Patent Application No. 18777148.0.

* cited by examiner

EXHAUST GAS CLEANING CATALYST

TECHNICAL FIELD

The present invention relates to an exhaust gas cleaning catalyst. More specifically, the present invention relates to a wall flow type exhaust gas cleaning catalyst.

The present application claims priority on the basis of Japanese Patent Application No. 2017-061422, which was filed on 27 Mar. 2017, and the entire contents of that application are incorporated by reference in the present specification.

BACKGROUND ART

Exhaust gases discharged from internal combustion engines such as motor vehicle engines contain particulate matter (PM) and harmful components such as hydrocarbons (HCs), carbon monoxide (CO) and nitrogen oxides ($NO_x$). Exhaust gas cleaning catalysts have been used in the past in order to efficiently trap and remove such PM and harmful components from exhaust gases.

Patent Literature 1 is cited as a prior art document that relates to this. Patent Literature 1 discloses a wall flow type exhaust gas cleaning catalyst comprising a substrate having a wall flow structure in which an entry side cell, in which only the end part on an exhaust gas inflow side is open, and an exit side cell, in which only the end part on an exhaust gas outflow side is open, are divided by a porous dividing wall, a first catalyst layer provided in an internal portion of the dividing wall so as to be in contact with the entry side cell, and a second catalyst layer provided in an internal portion of the dividing wall so as to be in contact with the exit side cell.

In a wall flow type exhaust gas cleaning catalyst, PM is trapped in pores at the surface of dividing walls and in internal portions of dividing walls as an exhaust gas passes through dividing walls. In addition, harmful components are eliminated as the exhaust gas passes through the catalyst layer. In the exhaust gas cleaning catalyst disclosed in Patent Literature 1, by providing catalyst layers in an internal portion of the dividing wall in contact with the entry side cell and an internal portion of the dividing wall in contact with the exit side cell, pressure loss is reduced and cleaning performance of harmful components is improved.

CITATION LIST

Patent Literature

Patent Literature 1: WO 2016/133086

SUMMARY OF INVENTION

However, investigations by the inventors of the present invention have confirmed that there is room for improvement in the configuration of such exhaust gas cleaning catalysts from the perspective of PM trapping performance. That is, in such exhaust gas cleaning catalysts, gas permeability is reduced in dividing wall portions where the first catalyst layer has been provided. As a result, it is difficult for an exhaust gas flowing into an entry side cell to flow through such dividing wall portions. In other words, an exhaust gas flowing into an entry side cell preferentially flows through a dividing wall portion where the first catalyst layer has not been provided, that is, through an internal portion of the dividing wall close to the opening of the entry side cell. As a result, in such exhaust gas cleaning catalysts, pores in internal portions of dividing walls are not sufficiently used for PM trapping in internal portions of dividing walls close to openings of entry side cells.

In view of the circumstances mentioned above, the purpose of the present invention is to provide a wall flow type exhaust gas cleaning catalyst that exhibits excellent PM trapping performance.

The present invention provides an exhaust gas cleaning catalyst which is disposed in an exhaust pathway of an internal combustion engine and cleans exhaust gas emitted from the internal combustion engine. This exhaust gas cleaning catalyst comprises a substrate having a wall flow structure in which an entry side cell, in which an end part on an exhaust gas inflow side is open and the end part on an exhaust gas outflow side is closed, and an exit side cell, in which an end part on an exhaust gas outflow side is open and the end part on an exhaust gas inflow side is closed, are divided by a porous dividing wall, and a first catalyst layer that includes a metal catalyst and is disposed in an internal portion of the dividing wall so as to be in contact with the exit side cell and not in contact with the entry side cell, and no catalyst layer is provided in the region in contact with the entry side cell.

This exhaust gas cleaning catalyst does not have a catalyst layer in the region in contact with the entry side cell, that is, does not have a catalyst layer in a surface or internal portion of the dividing wall in contact with the entry side cell. Due to this configuration, it is possible to reduce an imbalance in the amount of exhaust gas flowing in the direction along which the dividing wall extends. Therefore, even in a portion of a dividing wall close to an opening of an entry side cell, for example, pores in the internal portion of the dividing wall can be effectively used and excellent PM trapping performance can be achieved.

In a preferred aspect, the first catalyst layer is disposed with a length as large as the overall length of the dividing wall in the direction along which the dividing wall extends. Due to this configuration, the exhaust gas flows more uniformly in the direction along which the dividing wall extends, and the advantageous effect mentioned above can be better achieved.

A preferred aspect further comprises a second catalyst layer which includes a metal catalyst and is disposed at the surface of the dividing wall so as to be in contact with the exit side cell. Due to this configuration, uneliminated PM and harmful components that have been blown through the dividing wall can be effectively trapped and removed. Therefore, PM trapping performance and/or exhaust gas cleaning performance can be further improved.

In a preferred aspect, when the overall length of the dividing wall in the direction along which the dividing wall extends is designated as 100%, the second catalyst layer is disposed for a length that is 45% or more and 60% or less of the overall length of the dividing wall from the end part on the exhaust gas outflow side in the direction along which the dividing wall extends. If this length falls within the range mentioned above, exhaust gas cleaning performance can be further improved. Therefore, a balance between PM trapping performance and exhaust gas cleaning performance can be achieved to a higher level.

In a preferred aspect, the internal combustion engine is a gasoline engine. Gasoline engines have higher exhaust gas temperatures than, for example, diesel engines. As a result, the particle diameter of discharged PM is relatively small, and PM tends to be trapped in internal portions of dividing walls rather than dividing wall surfaces in exhaust gas cleaning catalysts. As a result, the effect mentioned above can be more effectively achieved in cases where the internal combustion engine is a gasoline engine.

DESCRIPTION OF EMBODIMENTS

Figure 1:
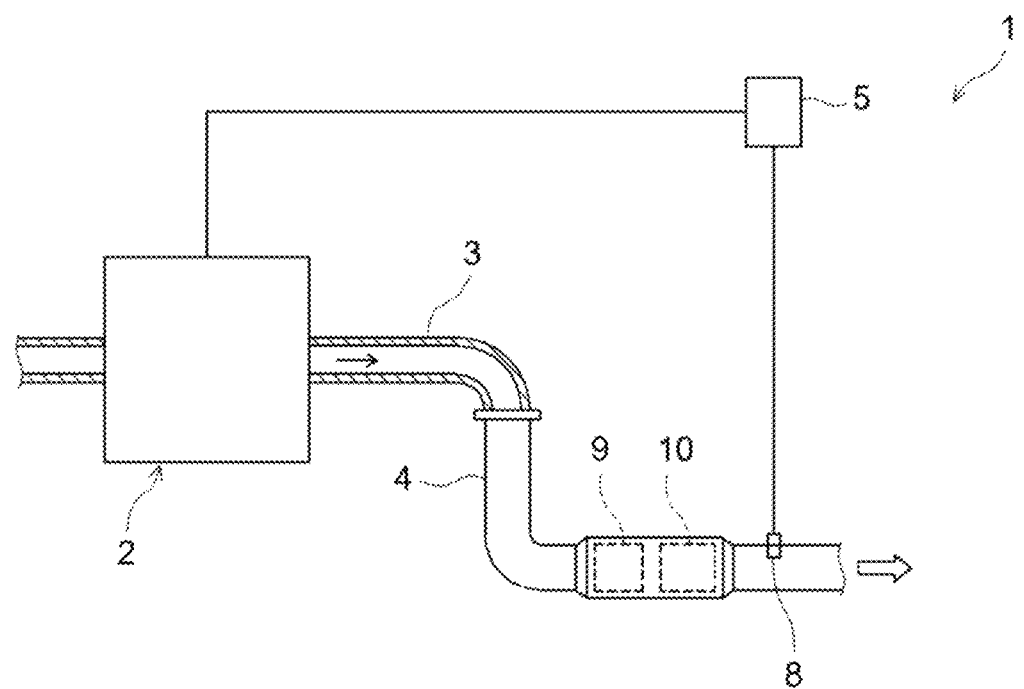
FIG. 1 is a schematic diagram that illustrates the configuration of an exhaust gas cleaning device and periphery thereof according to one embodiment.

Preferred embodiments of the present invention will now be explained while referring to the drawings. Moreover, matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field. In the drawings shown below, members and parts having the same action are given the same reference symbols, and duplicate explanations may be omitted or simplified. Dimensions shown in the drawings (lengths, widths, thicknesses, and so on) do not necessarily reflect actual dimensions. Moreover, cases where numerical ranges in the present specification are written as A to B (here, A and B are arbitrary numbers) mean not less than A and not more than B.

FIG. 1 is a schematic diagram that illustrates the configuration of an exhaust gas cleaning device 1 and the periphery thereof. The exhaust gas cleaning device 1 disclosed here is provided in the exhaust system of an internal combustion engine (engine) 2. A mixed gas containing oxygen and a fuel gas is supplied to the internal combustion engine 2. The internal combustion engine 2 combusts this mixed gas and converts combustion energy into mechanical energy. The combusted mixed gas is converted into exhaust gas and is discharged into the exhaust system. The internal combustion engine 2 in the present embodiment is constituted mainly from a motor vehicle gasoline engine. However, the internal combustion engine 2 may be an engine other than a gasoline engine (for example, a diesel engine).

The exhaust gas cleaning device 1 traps particulate matter (PM) contained in the exhaust gas discharged from the internal combustion engine 2, and eliminates harmful components contained in the exhaust gas, for example hydrocarbons (HCs), carbon monoxide (CO) and nitrogen oxides ($NO_x$). The exhaust gas cleaning device 1 comprises an exhaust pathway that connects the internal combustion engine 2 to an exhaust system, an engine control unit (ECU) 5, an upstream side catalyst 9 and a gasoline particulate filter (GPF) 10.

The exhaust pathway of the present embodiment is formed from an exhaust manifold 3 and an exhaust pipe 4. That is, an exhaust port (not shown) that is connected to the exhaust system of the internal combustion engine 2 is connected to one end of the exhaust manifold 3. The other end of the exhaust manifold 3 is connected to the exhaust pipe 4. Moreover, the arrow in the diagram shows the direction of flow of the exhaust gas.

The upstream side catalyst 9 and the GPF 10 are disposed part way along the exhaust pipe 4. Moreover, the GPF 10 is an example of the exhaust gas cleaning catalyst disclosed here. The configuration of the upstream side catalyst 9 may be similar to that used in the past, and is not particularly limited. The upstream side catalyst 9 may comprise, for example, a carrier and a noble metal, such as rhodium (Rh), palladium (Pd) or platinum (Pt), supported on the carrier. The upstream side catalyst 9 may be, for example, a conventional publicly known oxidation catalyst (DOC), three-way catalyst or $NO_x$ adsorbing/reducing catalyst (LNT). The upstream side catalyst 9 may have, for example, the function of increasing the temperature of an exhaust gas that flows into the GPF 10 when the GPF 10 is regenerated. Moreover, the upstream side catalyst 9 is not necessarily essential, and may be omitted. In addition, a downstream side catalyst may be disposed on the downstream side of the GPF 10.

The ECU 5 controls the exhaust gas cleaning device 1 and the internal combustion engine 2. The configuration of the ECU 5 may be similar to that used in the past, and is not particularly limited. The ECU 5 is, for example, a digital computer. Input ports (not shown) are provided in the ECU 5. The ECU 5 is electrically connected to sensors (for example, a pressure sensor 8) disposed at various locations in the exhaust gas cleaning device 1 and internal combustion engine 2. Due to this configuration, data detected by the sensors is transmitted as electrical signals via the input ports to the ECU 5. In addition, output ports (not shown) are provided in the ECU 5. The ECU 5 transmits control signals via the output ports. The ECU 5 is configured so as to control startup and shutdown of the exhaust gas cleaning device 1 according to, for example, the amount of exhaust gas discharged from the internal combustion engine 2.

Figure 2:
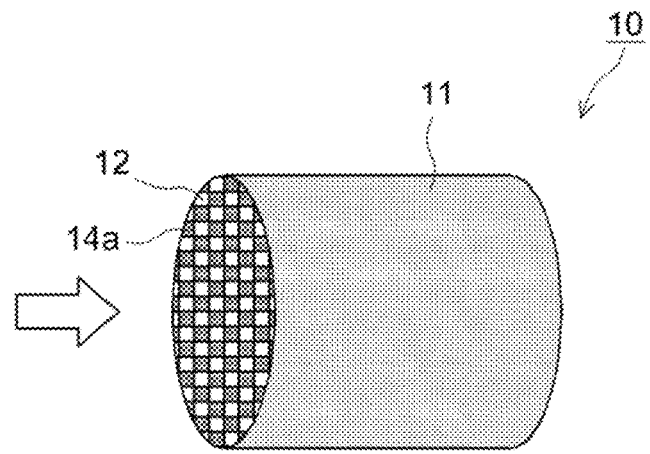
FIG. 2 is a perspective view that schematically illustrates an exhaust gas cleaning catalyst according to one embodiment.
Figure 3:
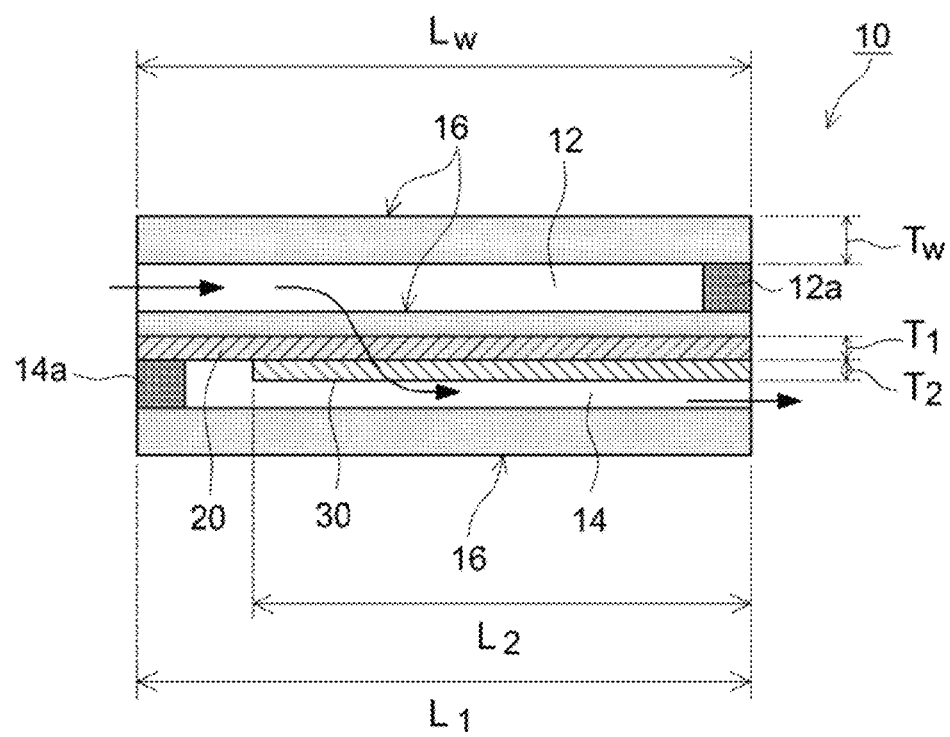
FIG. 3 is a partial cross-sectional view that schematically illustrates an exhaust gas cleaning catalyst according to one embodiment.

FIG. 2 is a perspective view of the GPF 10. FIG. 3 is a partial cross-sectional view in which one part of a cross section obtained by cutting the GPF 10 in the cylindrical axis direction is enlarged. Moreover, the direction of flow of the exhaust gas is shown by the direction of the arrows in FIGS. 2 and 3. That is, in FIGS. 2 and 3, the left hand side is the upstream side of the exhaust pipe 4 and the right hand side is the downstream side of the exhaust pipe 4. The GPF 10 has the function of trapping particulate matter (PM) contained in the exhaust gas and eliminating harmful components contained in the exhaust gas. The GPF 10 comprises a substrate 11 having a wall flow structure, a first catalyst layer 20 and a second catalyst layer 30.

The substrate 11 constitutes the framework of the GPF 10. For the substrate 11, a variety of conventional materials and forms that were used in the past in such applications can be used as appropriate. For example, substrates comprising highly heat-resistant materials such as ceramics, such as cordierite, aluminum titanate and silicon carbide (SiC), and alloys, such as stainless steel, can be advantageously used. In the present embodiment, the overall outer shape of the substrate 11 is a circular cylinder. However, the overall outer shape of the substrate 11 is not particularly limited, and can be, for example, an elliptic cylinder, a polygonal cylinder, or the like.

The substrate 11 has an entry side cell 12, an exit side cell 14, and a dividing wall 16 that divides the entry side cell 12 and the exit side cell 14. The end part on the exhaust gas inflow side of the entry side cell 12 is open. A sealing part 12a is disposed at the end part on the exhaust gas outflow side of the entry side cell 12. Due to this configuration, the end part on the exhaust gas outflow side of the entry side cell 12 is sealed. The end part on the exhaust gas outflow side of the exit side cell 14 is open. A sealing part 14a is disposed at the end part on the exhaust gas inflow side of the exit side cell 14. Due to this configuration, the end part on the exhaust gas inflow side of the exit side cell 14 is sealed. The shape of the entry side cell 12 and exit side cell 14 is not particularly limited. For example, the shape of the entry side cell 12 and the exit side cell 14 may be a variety of geometric shapes, such as a rectangular shape such as a square, a parallelogram, a rectangle or a trapezium; a triangle; another polygon (for example, a hexagon or octagon); or a circle.

The dividing wall 16 divides the entry side cell 12 and the exit side cell 14. The dividing wall 16 has a porous structure through which the exhaust gas can pass. The porosity of the dividing wall 16 is not particularly limited, but is generally 20 to 70 vol. % and may be, for example, 50 to 60 vol. %, from perspectives such as improving PM trapping performance and reducing pressure loss. The average pore diameter of the dividing wall 16 is not particularly limited, but is generally 5 to 30 μm and may be, for example, 10 to 20 μm, from perspectives such as improving PM trapping performance and reducing pressure loss. The thickness of the dividing wall 16, that is, the length $T_w$ of the dividing wall 16 in a direction orthogonal to the direction along which the dividing wall extends, is not particularly limited, but should generally be 1 to 30 mil (1 mil is approximately 25.4 μm) from perspectives such as improving PM trapping performance and reducing pressure loss.

The first catalyst layer 20 is disposed in an internal portion of the dividing wall 16 so as to be in contact with the exit side cell 14. The first catalyst layer 20 includes a metal catalyst. Typically, the metal catalyst is supported on a carrier.

For the carrier of the first catalyst layer 20, a variety of conventional material that were used in the past in such applications can be used as appropriate. For example, carriers comprising metal oxides, such as alumina ($Al_2O_3$), ceria ($CeO_2$), zirconia ($ZrO_2$), silica ($SiO_2$) and Titania ($TiO_2$) and solid solutions of these (for example, a zirconia-ceria composite oxide (ZC composite oxide; $ZrO_2$—$CeO_2$)) can be advantageously used. Of these, carriers comprising alumina and ZC composite oxides are preferred.

The metal catalyst in the first catalyst layer 20 is, for example, a reactive catalyst for burning and removing PM trapped in the first catalyst layer 20 and eliminating (detoxifying) harmful substances in the exhaust gas. By disposing the metal catalyst in an internal portion of the dividing wall 16 so as to be in contact with the exit side cell 14, it is possible to achieve excellent catalytic activity throughout the entire dividing wall 16 of the GPF 10. As a result, harmful components in the exhaust gas can be efficiently eliminated.

A variety of metals able to function as oxidizing catalysts and reducing catalysts can be used, as appropriate, as the metal catalyst in the first catalyst layer 20. For example, noble metals such as rhodium, palladium and platinum can be advantageously used. Ruthenium (Ru), osmium (Os), iridium (Ir), silver (Ag), gold (Au), and the like, may also be used. In a preferred aspect, the first catalyst layer 20 includes a catalytic metal having high oxidation activity, for example palladium and/or platinum. In this way, HCs and CO in the exhaust gas can be eliminated particularly well. In another preferred aspect, the first catalyst layer 20 includes rhodium, which exhibits high reduction activity. In this way, $NO_x$ in the exhaust gas can be eliminated particularly well.

In addition to the metal catalyst and the carrier on which the metal catalyst is supported, the first catalyst layer 20 may include optional components as appropriate. Examples of such optional components include co-catalysts on which a metal catalyst is not supported, OSC (oxygen storage capacity) materials, $NO_x$ adsorbents having $NO_x$ adsorption performance, and stabilizers. Examples of co-catalysts include alumina and silica. Examples of stabilizers include rare earth elements, such as lanthanum (La) and yttrium (Y), alkaline earth elements, such as calcium (Ca) and barium (Ba), and other transition metal elements. Of these, it is preferable to incorporate barium. By incorporating a stabilizer in the first catalyst layer 20, poisoning of the metal catalyst can be suppressed and catalytic activity can be advantageously improved. In addition, dispersibility of the metal catalyst can be increased, and sintering, which is caused by grain growth in the metal catalyst, can be suppressed.

The coating amount of the first catalyst layer 20 is not particularly limited, but is generally 100 g/L or less, and preferably 80 g/L or less, such as 50 g/L or less, per 1 L of substrate volume (overall bulk volume including the volume of cells) from the perspective of effectively using pores in the dividing wall 16 and further improving PM trapping performance. Meanwhile, from perspectives such as PM combustion reaction properties and further improving exhaust gas cleaning performance, the coating amount of the first catalyst layer 20 should generally be 5 g/L or more, and preferably 10 g/L or more, such as 20 g/L or more, per 1 L of substrate volume.

Typically, the first catalyst layer 20 is disposed in the direction along which the dividing wall 16 extends from the end part on the exhaust gas outflow side. The length $L_1$ of the first catalyst layer 20 in the direction of extension is not particularly limited, but should generally be 0.5 $L_w$ or more, preferably 0.8 $L_w$ or more, and more preferably 0.9 $L_w$ or more, wherein $L_w$ is the overall length of the dividing wall 16 in the direction of extension. In other words, $L_1$ should generally be 50% or more, preferably 80% or more, and more preferably 90% or more, of the overall length $L_w$ of the dividing wall 16. In particular, $L_1 \approx L_w$, that is, the first catalyst layer 20 should be disposed with a length as large as the overall length $L_w$ of the dividing wall 16 in the direction along which the dividing wall 16 extends. Due to this configuration, the flow rate of the exhaust gas in the direction along which the dividing wall 16 extends can be made to be more uniform. Therefore, pores in the dividing wall 16 can be used far more efficiently and PM trapping performance can be further improved.

In the present embodiment, the first catalyst layer 20 is disposed so as to be in contact with the exit side cell 14 and not in contact with the entry side cell 12. In other words, the thickness $T_1$ of the first catalyst layer 20 (that is, the length in the direction from the surface of the dividing wall 16 in contact with the exit side cell 14 towards the entry side cell 12) is less than the thickness $T_w$ of the overall dividing wall 16. In other words, $T_1$ and $T_w$ satisfy the inequality $T_1 < T_w$. The thickness $T_1$ of the first catalyst layer 20 should generally be 0.9 $T_w$ or less, and typically 0.8 $T_w$ or less, such as 0.6 $T_w$ or less, wherein $T_w$ is the thickness of the dividing wall 16. In addition, the thickness $T_1$ of the first catalyst layer 20 should generally be 0.2 $T_w$ or more, and typically 0.3 $T_w$ or more, such as 0.4 $T_w$ or more. Due to this configuration, it is possible to increase contact between PM and the metal catalyst and further improve PM burning reaction properties (regeneration rate). In addition, it is possible to increase contact between the metal catalyst and harmful components in the exhaust gas and further improve exhaust gas cleaning performance.

Moreover, in the present specification, the wording "the catalyst layer is disposed in an internal portion of the dividing wall" means that the catalyst layer is present mainly in an internal portion of the dividing wall. In other words, this means that the catalyst layer is present (localized) more towards an internal portion of the dividing wall. More specifically, when a cross section of the first catalyst layer 20 is observed using, for example, an electron microscope, the total amount of metal catalyst within a length of 0.1 $L_w$ from the end part on the exhaust gas outflow side in the direction along which the dividing wall 16 extends is designated as 100 mass %. Here, the proportion of metal catalyst present in an internal portion of the dividing wall 16 is typically 80 mass % or more, such as 90 mass % or more, and preferably 95 mass % or more. Therefore, as a result of disposing a catalyst layer outside the dividing wall 16 (typically at the surface), it is possible to clearly differentiate from a case where a part of the catalyst layer unintentionally penetrates into in an internal portion of the dividing wall 16.

The second catalyst layer 30 is disposed at the surface of the dividing wall 16 so as to be in contact with the exit side cell 14. The second catalyst layer 30 covers some or all of the surface of the exit side cell 14 side of the first catalyst layer 20. In other words, the second catalyst layer 30 is layered on the first catalyst layer 20. That is, in a part of the dividing wall 16 in the direction of extension, a two layer structure is formed from the first catalyst layer 20 and the second catalyst layer 30. The second catalyst layer 30 includes a metal catalyst. Typically, the metal catalyst is supported on a carrier. Moreover, carriers listed as carriers of the first catalyst layer 20 can be used, as appropriate, as the carrier of the second catalyst layer 30. In addition to the metal catalyst and the carrier on which the metal catalyst is supported, the second catalyst layer 30 may, like the first catalyst layer 20, include optional components as appropriate.

The metal catalyst in the second catalyst layer 30 is, for example, a reactive catalyst for burning and removing PM trapped in the second catalyst layer 30 and eliminating (detoxifying) harmful substances in the exhaust gas. By disposing a metal catalyst at the surface of the dividing wall 16 so as to be in contact with the exit side cell 14, even if PM and uneliminated harmful components are blown through the dividing wall 16, these can be effectively trapped and eliminated.

Metals listed as metal catalysts in the first catalyst layer 20 can be used, as appropriate, as the metal catalyst in the second catalyst layer 30. The metal catalyst in the second catalyst layer 30 may be a metal that is the same as, or different from, the metal catalyst in the first catalyst layer 20. From the perspectives of suppressing sintering of the metal catalyst and increasing the durability of the GPF 10, different types of metals may be separately supported in the first catalyst layer 20 and the second catalyst layer 30. In preferred aspect, the second catalyst layer 30 includes rhodium, which exhibits high reduction activity. In this way, $NO_x$ in the exhaust gas can be eliminated particularly well. In another preferred aspect, the second catalyst layer 30 includes a catalytic metal having high oxidation activity, for example palladium and/or platinum. In this way, HCs and CO in the exhaust gas can be eliminated particularly well.

The coating amount of the second catalyst layer 30 is not particularly limited, but is preferably less than the coating amount of the first catalyst layer 20 from the perspective of reducing pressure loss. Specifically, the coating amount of the second catalyst layer should generally be 80 g/L or less, and preferably 50 g/L or less, such as 30 g/L or less, per 1 L of substrate volume. Meanwhile, from the perspective of further improving exhaust gas cleaning performance, the coating amount of the second catalyst layer should generally be 5 g/L or more, and preferably 10 g/L or more, such as 15 g/L or more, per 1 L of substrate volume. Due to this configuration, it is possible to achieve a high level of balance between reduction in pressure loss and an improvement in cleaning performance.

Typically, the second catalyst layer 30, like the first catalyst layer 20, is disposed from the end part on the exhaust gas outflow side in the direction along which the dividing wall 16 extends. The length $L_2$ of the second catalyst layer 30 in the direction of extension is not particularly limited. In a preferred aspect, from the perspectives of standardizing the flow rate of the exhaust gas in the direction along which the dividing wall 16 extends and further improving PM trapping performance, the length $L_2$ of the second catalyst layer 30 in the direction of extension should generally be 0.6 $L_w$ or more, preferably 0.8 $L_w$ or more, and more preferably 0.9 $L_w$ or more, wherein $L_w$ is the overall length of the dividing wall 16 in the direction of extension. In other words, $L_2$ should generally be 60% or more, preferably 80% or more, and more preferably 90% or more, of the overall length $L_w$ of the dividing wall 16. For example, $L_2 \approx L_w$ that is, the second catalyst layer 30 should be disposed with a length as large as the overall length $L_w$ of the dividing wall 16 in the direction along which the dividing wall 16 extends.

In another preferred aspect, from the perspective of further improving exhaust gas cleaning performance, the length $L_2$ of the second catalyst layer 30 in the direction of extension should generally be 0.3 $L_w$ to 0.8 $L_w$, preferably 0.3 $L_w$ to 0.6 $L_w$, and more preferably 0.45 $L_w$ to 0.6 $L_w$, wherein $L_w$ is the overall length of the dividing wall 16 in the direction of extension. In other words, $L_2$ should generally be 30% to 80%, preferably 30% to 60%, and more preferably 45% to 60%, of the overall length $L_w$ of the dividing wall 16.

The second catalyst layer 30 is disposed at the surface of the exit side cell 14. The thickness $T_2$ of the second catalyst layer 30 may be the same as, or different from, the thickness $T_1$ of the first catalyst layer 20. From the perspective of better reducing pressure loss, the thickness $T_2$ of the second catalyst layer 30 is preferably less than the thickness $T_1$ of the first catalyst layer 20. Specifically, the thickness $T_2$ of the second catalyst layer 30 should generally be 0.8 $T_w$ or less, and typically 0.6 $T_w$ or less, such as 0.5 $T_w$ or less, wherein $T_w$ is the thickness of the dividing wall 16. In addition, the thickness $T_2$ of the second catalyst layer 30 should generally be 0.1 $T_w$ or more, and typically 0.2 $T_w$ or more, such as 0.3 $T_w$ or more. Due to this configuration, it is possible to achieve a better balance between reduction in pressure loss and catalyst performance (that is, PM trapping performance and exhaust gas cleaning performance).

In the GPF 10, the first catalyst layer 20 and/or second catalyst layer 30 should be disposed with a length as large as the overall length $L_w$ of the dividing wall 16. Due to this configuration, PM and harmful components in the exhaust gas can be more reliably eliminated. In other words, it is possible to better prevent the exhaust gas from slipping through parts where a catalyst layer is not disposed and being discharged without being cleaned.

In the GPF 10, the overall length $L_w$ of the dividing wall 16, the length $L_1$ of the first catalyst layer 20 and the length $L_2$ of the second catalyst layer 30 should satisfy the formula: $L_w<(L_1+L_2)\leq 2L_w$. In other words, the first catalyst layer 20 and second catalyst layer 30 should be overlaid on each other in the direction along which the dividing wall 16 extends. Due to this configuration, a balance between PM trapping performance and exhaust gas cleaning performance can be achieved to a higher level. The length over which the first catalyst layer 20 and second catalyst layer 30 are overlaid in the direction of extension is not particularly limited, but should generally be 50% or more, and preferably 80% or more, such as 90% or more, of the overall length $L_w$ of the dividing wall 16.

In the present embodiment, the GPF 10 does not have a catalyst layer in the region in contact with the entry side cell 12. In other words, the GPF 10 does not have a catalyst layer at the surface of the dividing wall 16 in contact with the entry side cell 12 or in an internal portion of the dividing wall 16 in contact with the entry side cell 12. The GPF 10 has substantially no metal catalyst in the region in contact with the entry side cell 12. Due to this configuration, the flow rate of the exhaust gas in the direction along which the dividing wall 16 extends can be made to be uniform.

Moreover, in the present specification, the wording "does not have a catalyst layer in the region in contact with the entry side cell 12" means that a catalyst layer is deliberately not formed in the region in contact with the entry side cell 12. In other words, this means that substantially no metal catalyst is disposed in the region in contact with the entry side cell 12. For example, when the total amount of catalyst layers in the GPF 10 (for example, the first catalyst layer 20 and the second catalyst layer 30) is designated as 100 mass %, generally 95 mass % or more, such as 98 mass % or more, and preferably 99.5 mass % or more, of the catalyst layers is disposed in regions that are not in contact with the entry side cell 12. Therefore, cases where a part of a catalyst layer that should be disposed in a region that is not in contact with the entry side cell 12 unavoidably or unintentionally penetrates into the region in contact with the entry side cell 12, which can occur during production processes and the like, are permitted.

In the GPF 10, which has a configuration such as that described above, exhaust gas discharged from the internal combustion engine 2 flows into the entry side cell 12 from the opening on the exhaust gas inflow side. The exhaust gas flowing in from the entry side cell 12 passes through the dividing wall 16 having a porous structure and reaches the exit side cell 14. Here, PM in the exhaust gas is mainly trapped in pores at the surface of the entry side cell 12 in the dividing wall 16 and in an internal portion of the dividing wall 16. In the present embodiment, the GPF 10 does not have a catalyst layer in the region in contact with the entry side cell 12. As a result, the exhaust gas diffuses evenly in the direction along which the dividing wall 16 extends. In other words, there is little imbalance in gas flow in the direction along which the dividing wall 16 extends. Due to this configuration, pores in an internal portion of the dividing wall 16 can be effectively used and PM can be efficiently trapped.

In addition, in the region of the GPF 10 that is in contact with the exit side cell 14, the first catalyst layer 20 is disposed in an internal portion of the dividing wall 16 and the second catalyst layer 30 is disposed at the surface of the dividing wall 16. Harmful components in the exhaust gas are cleaned while the exhaust gas passes through the first catalyst layer 20 and/or the second catalyst layer 30. Exhaust gas that passes through the dividing wall 16 and reaches the exit side cell 14 is discharged to outside the GPF 10 from the opening on the exhaust gas outflow side in a state whereby PM and harmful components have been removed from the exhaust gas.

Explanations will now be given of test examples relating to the present invention, but it is not intended that the present invention is limited to these test examples.

Test Example I: Investigation into Presence/Absence of Entry Side Catalyst Layer As Comparative Example 1, an exhaust gas cleaning catalyst was produced in such a way that an entry side catalyst layer was provided in an internal portion of a dividing wall so as to be in contact with an entry side cell and an exit side catalyst layer was provided in an internal portion of a dividing wall so as to be in contact with an exit side cell.

Specifically, a slurry A was first prepared by mixing palladium nitrate, an alumina powder ($\gamma$-$Al_2O_3$), a ZC composite oxide ($ZrO_2$—$CeO_2$) powder, barium sulfate ($BaSO_4$) and an $Al_2O_3$-based binder in ion exchanged water. Moreover, the slurry A was prepared in such a way that the content of Pd was 0.59 g/L, the content of $Al_2O_3$ was 12.25 g/L, the content of $ZrO_2$—$CeO_2$ was 31.85 g/L and the content of $BaSO_4$ was 1.8 g/L, each relative to the volume of the substrate.

Next, a slurry B was prepared by mixing rhodium nitrate, an alumina powder, a ZC composite oxide powder and an $Al_2O_3$-based binder in ion exchanged water. Moreover, the slurry B was prepared in such a way that the content of Rh was 0.15 g/L, the content of $Al_2O_3$ was 6.53 g/L and the content of $ZrO_2$—$CeO_2$ was 11.25 g/L, each relative to the volume of the substrate.

Next, a wall flow type cordierite substrate such as that shown in FIGS. 2 and 3 was prepared. Next, the prepared slurry A was coated by means of depressurization suction in an internal portion of a part of the cordierite substrate having a length of 45% of the overall length $L_w$ of the substrate (0.45 $L_w$) in the direction along which the dividing wall extends from the end part of the cordierite substrate on the exhaust gas inflow side, and then dried and fired. Due to this configuration, an entry side catalyst layer was formed in an internal portion of the dividing wall so as to be in contact with the entry side cell. Moreover, the coating amount of the entry side catalyst layer per unit volume of substrate was 46.5 g/L. Next, the prepared slurry B was coated by means of depressurization suction in an internal portion of a part of the cordierite substrate having a length of 70% of the overall length $L_w$ of the substrate (0.7 $L_w$) in the direction along which the dividing wall extends from the end part of the cordierite substrate on the exhaust gas outflow side, and then dried and fired. Due to this configuration, an exit side catalyst layer was formed in an internal portion of the dividing wall so as to be in contact with the exit side cell. Moreover, the coating amount of the exit side catalyst layer per unit volume of substrate was 17.9 g/L.

An exhaust gas cleaning catalyst of Comparative Example 1 was prepared in this way.

In addition, a catalyst layer having a configuration such as that shown in FIG. 3 was formed as Example 1. In other words, an exhaust gas cleaning catalyst was produced in such a way that no catalyst layer was present in the region in contact with the entry side cell and catalyst layers were provided in the internal portion and at the surface of the dividing wall so as to be in contact with the exit side cell. Specifically, the prepared slurry A was coated by means of depressurization suction in an internal portion of a part of the cordierite substrate having a length of 100% of the overall length $L_w$ of the substrate (the entire substrate) at a thickness that was less than the thickness $T_w$ of the dividing wall 16 in the direction along which the dividing wall extends from the end part of the cordierite substrate on the exhaust gas outflow side, and then dried and fired. Due to this configuration, a first catalyst layer was formed in an internal portion of the dividing wall so as to be in contact with the exit side cell. Next, the prepared slurry B was coated by means of depressurization suction on the surface of a part of the cordierite substrate having a length of 90% of the overall length $L_w$ of the substrate (0.9 $L_w$) in the direction along which the dividing wall extends from the end part of the cordierite substrate on the exhaust gas outflow side, and then dried and fired. Due to this configuration, a second catalyst layer was formed on the surface of the dividing wall so as to be in contact with the exit side cell.

(Evaluation of PM Trapping Performance)

The PM trapping performance of the prepared exhaust gas cleaning catalysts was evaluated. Specifically, a direct injection gasoline motor vehicle was run in a prescribed mode, and the number (a) of PM particles discharged from the engine (particles/km) was measured. In addition, the exhaust gas cleaning catalysts of the examples were heat treated at a temperature of 600° C. or higher. Next, the exhaust gas cleaning catalyst of each example was fitted to the exhaust pathway of the motor vehicle, which was then run in the same mode as above. Here, the number (b) of PM particles discharged from a tailpipe disposed downstream of the exhaust gas cleaning catalyst (particles/km) was measured. The PM discharge ratio was then calculated using the formula: PM discharge proportion (%)=(b/a)×100. The results are shown in FIG. 4.

Figure 4:
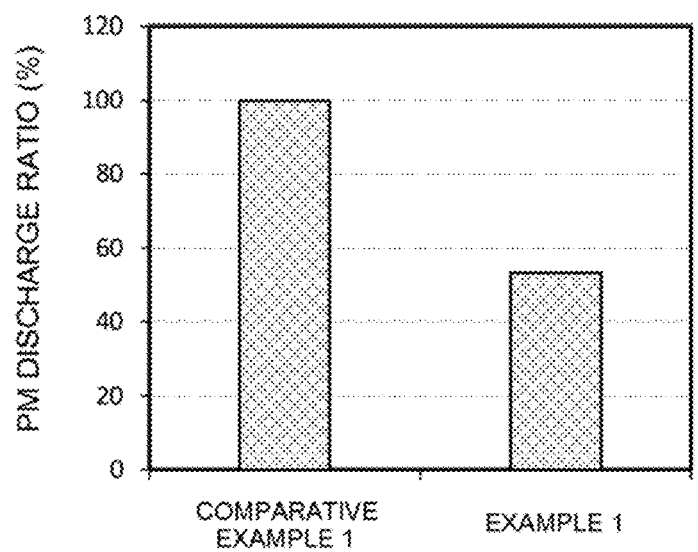
FIG. 4 is a graph in which PM discharge ratios in Comparative Example 1 and Example 1 are compared.

FIG. 4 is a graph in which PM discharge ratios in Comparative Example 1 and Example 1 are compared. In FIG. 4, the PM discharge ratio is a relative value, with the PM discharge ratio of Comparative Example 1 being 100% (the standard). As shown in FIG. 4, the PM discharge ratio of Example 1 was reduced to approximately half that of Comparative Example 1. That is, the PM trapping performance of Example 1 is better than that of Comparative Example 1. It is thought that the reason for this is as follows.

In Comparative Example 1, an entry side catalyst layer was formed in a part of the dividing wall in contact with the entry side cell at a length of 45% of the overall length $L_w$ of the substrate along the direction of extension of the dividing wall from the end part of the substrate on the exhaust gas inflow side. Due to this configuration, pores in an internal portion of the dividing wall were narrower in that part of the dividing wall where the entry side catalyst layer was formed. As a result, the exhaust gas preferentially flowed into parts of the dividing wall where the entry side catalyst layer was not formed, that is, those parts of the dividing wall close to the end part of the substrate on the exhaust gas outflow side. As a result, it is thought that pores in an internal portion of the dividing wall were not effectively used in those parts of the dividing wall close to the end part of the cordierite substrate on the exhaust gas inflow side, and that the frequency of contact between the exhaust gas and the dividing wall decreased. Meanwhile, in Example 1, in which no catalyst layer was present in the region in contact with the entry side cell, the flow of exhaust gas in the direction along which the dividing wall extends is unlikely to be imbalanced. It is thought that, as a result, the entire dividing wall can be fully used for trapping PM, and the frequency of contact between the exhaust gas and the dividing wall is improved.

Test Example II: Investigation into Length of Second Catalyst Layer

Exhaust gas cleaning catalysts of Examples 2 to 5 were produced in the same way as in Example 1, except that the slurry B was coated on a part of the substrate having a length of 30% to 80% of the overall length $L_w$ of the substrate (0.3 $L_w$ to 0.8 $L_w$) in the direction along which the dividing wall extends from the end part of the substrate on the exhaust gas outflow side.

(Evaluation of Exhaust Gas Cleaning Performance)

The cleaning performance of the prepared exhaust gas cleaning catalysts was evaluated using a motor vehicle. Specifically, an exhaust gas cleaning catalyst was disposed in the exhaust pathway of a direct injection gasoline motor vehicle, and the catalyst inlet gas temperature was increased from 100° C. to 520° C. at a temperature increase rate of 10° C./min using a heat exchanger. Here, the $NO_x$ component elimination rate was continuously measured from the ratio of inlet gas temperature and outlet gas temperature, and the inlet gas temperature ($T_{50}/NO_x$) when the $NO_x$ component elimination rate reached 50% was evaluated. The results are shown in Table 1 and FIG. 5. Moreover, a lower $T_{50}/NO_x$ ratio means better cleaning performance.

In addition, the exhaust gas cleaning catalysts of Examples 2 to 4 were evaluated in terms of PM trapping performance in the same way as in Test Example I. Evaluation results (PM discharge ratio) are shown in Table 1 and FIG. 5.

TABLE 1

| | Coating length $L_2$ of second catalyst layer* | $T_{50}/NO_x$ | PM discharge ratio (relative value)** |
|---|---|---|---|
| Example 1 | 90% | 283° C. | 53.4% |
| Example 2 | 80% | 266.1° C. | 61.3% |
| Example 3 | 60% | 263.5° C. | 68.8% |
| Example 4 | 45% | 258.3° C. | 75.7% |
| Example 5 | 30% | 265.4° C. | — |

*The overall length $L_w$ of the substrate is 100%
**The PM trapping ratio of Comparative Example 1 is designated as 100%

Figure 5:
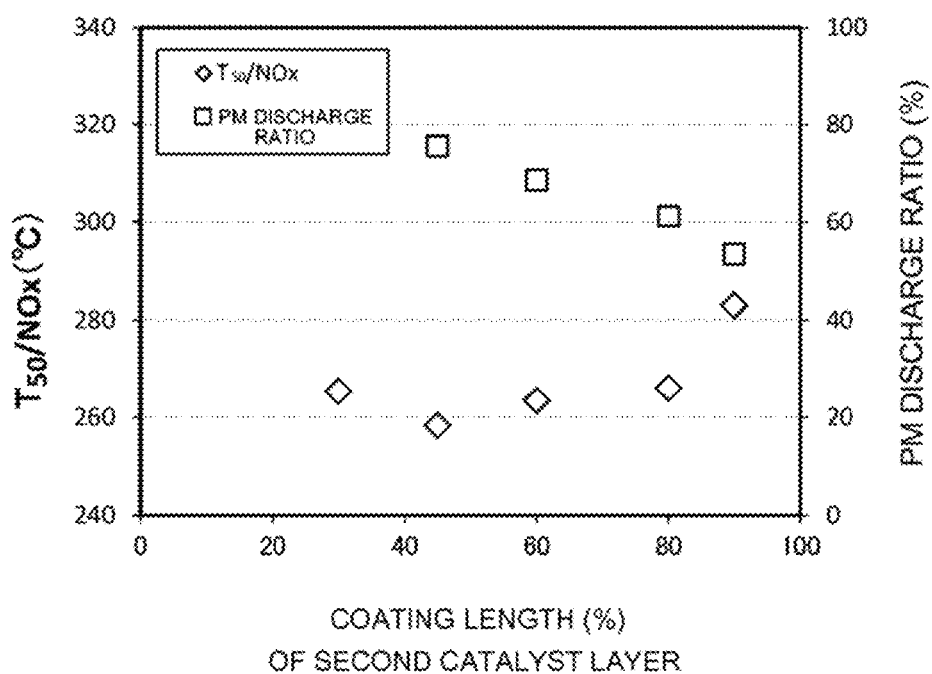
FIG. 5 is a graph that shows the relationship between catalyst performance and the coating length of the second catalyst layer.

FIG. 5 is a graph that shows the relationship between catalyst performance and the coating length of the second catalyst layer. As shown in Table 1 and FIG. 5, Examples 1 to 5 all had a lower PM discharge ratio and better PM trapping performance than Comparative Example 1. Of these examples, those examples having a longer length $L_2$ of the second catalyst layer in the direction of extension had a lower PM discharge ratio and better PM trapping performance. Therefore, from the perspective of PM trapping performance, it can be said that when the overall length $L_w$ of the dividing wall in the direction of extension is designated as 100%, the length $L_2$ of the second catalyst layer in the direction of extension should generally be 45% or more, preferably 60% or more, more preferably 80% or more, and particularly preferably 90% or more.

Meanwhile, in comparing the exhaust gas cleaning performance of Examples 1 to 5, the value of $T_{50}/NO_x$ was somewhat higher in a case where the length $L_2$ of the second catalyst layer in the direction of extension was 90%. Therefore, from the perspective of $NO_x$ cleaning performance, it can be said that when the overall length $L_w$ of the dividing wall in the direction of extension is designated as 100%, the length $L_2$ of the second catalyst layer in the direction of extension should be 30% to 80% or 30% to 60%. In view of the investigations above, it can be said that the length $L_2$ of the second catalyst layer in the direction of extension should generally be 45% to 80%, and especially 45% to 60%, from the perspective of achieving a balance between PM trapping performance and exhaust gas cleaning performance.

Specific examples of the present invention have been explained in detail above, but these are merely examples, and do not limit the scope of the invention. The features set forth in the claims also encompass modes obtained by variously modifying or altering the specific examples shown above.

For example, in the embodiment described above, the GPF 10 is provided with the first catalyst layer 20 and the second catalyst layer 30, but the present invention is not limited to this embodiment. It is possible for the GPF 10 not to have second catalyst layer 30. In addition, the GPF may have another catalyst layer in addition to the first catalyst layer 20 and second catalyst layer 30.

For example, in the embodiment described above, the exhaust gas cleaning catalyst is the GPF 10, but the present invention is not limited to this embodiment. For example, in cases where the internal combustion engine 2 is a diesel engine, the exhaust gas cleaning catalyst may be a diesel particulate filter (DPF).

REFERENCE SIGNS LIST

1 Exhaust gas cleaning device
2 Internal combustion engine
10 GPF (exhaust gas cleaning catalyst)
11 Substrate
12 Entry side cell
14 Exit side cell
16 Dividing wall
20 First catalyst layer
30 Second catalyst layer

The invention claimed is:

1. An exhaust gas cleaning catalyst configured to be disposed in an exhaust pathway of an internal combustion engine and to clean exhaust gas emitted from the internal combustion engine, the exhaust gas cleaning catalyst comprising:
 a substrate having a wall flow structure including:
  an entry side cell having a first end part on an exhaust gas inflow side that is open and a second end part on an exhaust gas outflow side that is closed; and
  an exit side cell having a second end part on an exhaust gas outflow side that is open, and a first end part on an exhaust gas inflow side that is closed, the entry side cell and the exit side cell being divided by a porous dividing wall; and
 a first catalyst layer including a metal catalyst, wherein the first catalyst layer is disposed in an internal portion of the porous dividing wall so as to be in contact with the exit side cell and be separated from the entry side cell by the porous dividing wall, the first catalyst layer having a thickness less than a thickness of the porous dividing wall,
 wherein the entry side cell is separated from all catalyst layers.

2. The exhaust gas cleaning catalyst according to claim 1, wherein the first catalyst layer extends along an entire length of the porous dividing wall in a direction from the exhaust gas inflow side to the exhaust gas outflow side.

3. The exhaust gas cleaning catalyst according to claim 1, further comprising a second catalyst layer including a metal catalyst, the second catalyst layer being disposed at a surface of the first catalyst layer so as to be in contact with the exit side cell.

4. The exhaust gas cleaning catalyst according to claim 3, wherein when an overall length of the porous dividing wall in a direction along which the porous dividing wall extends is designated as 100%, the second catalyst layer has a length that is 45% to 60% of the overall length of the porous dividing wall in a direction from the exhaust gas outflow side to the exhaust gas inflow side.

5. The exhaust gas cleaning catalyst according to claim 3, wherein the metal catalyst of the first catalyst layer includes a noble metal.

6. The exhaust gas cleaning catalyst according to claim 3, wherein the metal catalyst of the first catalyst layer includes at least one metal selected from the group consisting of rhodium, palladium, and platinum.

7. The exhaust gas cleaning catalyst according to claim 6, wherein the metal catalyst of the second catalyst layer includes at least one metal selected from the group consisting of rhodium, palladium, and platinum.

8. The exhaust gas cleaning catalyst according to claim 1, wherein the internal combustion engine is a gasoline engine.

9. The exhaust gas cleaning catalyst according to claim 1, wherein the metal catalyst of the first catalyst layer includes a noble metal.

10. The exhaust gas cleaning catalyst according to claim 1, wherein the metal catalyst of the first catalyst layer includes at least one metal selected from the group consisting of rhodium, palladium, and platinum.

\* \* \* \* \*